United States Patent
Lewis

(10) Patent No.: US 9,298,524 B2
(45) Date of Patent: Mar. 29, 2016

(54) VIRTUAL BASEBOARD MANAGEMENT CONTROLLER

(71) Applicant: Insyde Software Corp., Taipei (TW)

(72) Inventor: Timothy Andrew Lewis, El Dorado Hills, CA (US)

(73) Assignee: Insyde Software Corp., Taipei (TW)

( * ) Notice: Subject to any disclaimer, the term of this patent is extended or adjusted under 35 U.S.C. 154(b) by 183 days.

(21) Appl. No.: 14/221,544

(22) Filed: Mar. 21, 2014

(65) Prior Publication Data

US 2014/0289570 A1   Sep. 25, 2014

Related U.S. Application Data

(60) Provisional application No. 61/804,556, filed on Mar. 22, 2013.

(51) Int. Cl.
*G06F 11/30* (2006.01)
*G06F 11/07* (2006.01)
*G06F 11/34* (2006.01)

(52) U.S. Cl.
CPC ............ *G06F 11/07* (2013.01); *G06F 11/3055* (2013.01); *G06F 11/3089* (2013.01); *G06F 11/3006* (2013.01); *G06F 11/3476* (2013.01); *G06F 2201/815* (2013.01)

(58) Field of Classification Search
CPC ............ G06F 11/3055; G06F 11/3058; G06F 11/2025; G06F 2201/815; H04L 67/10
See application file for complete search history.

(56) References Cited

U.S. PATENT DOCUMENTS

| | | | |
|---|---|---|---|
| 6,321,289 B1 * | 11/2001 | Engfer | G06F 9/542 710/260 |
| 2004/0268140 A1 | 12/2004 | Zimmer et al. | |
| 2006/0184349 A1 * | 8/2006 | Goud | G06F 9/45537 703/24 |
| 2007/0011507 A1 * | 1/2007 | Rothman | G06F 11/2736 714/718 |
| 2007/0061634 A1 * | 3/2007 | Marisetty | G06F 11/0706 714/48 |
| 2007/0233455 A1 * | 10/2007 | Zimmer | G06F 9/546 703/27 |
| 2007/0234023 A1 * | 10/2007 | Wu | G06F 8/61 713/1 |
| 2008/0141077 A1 | 6/2008 | Swanson et al. | |
| 2009/0249319 A1 * | 10/2009 | Bai | G06F 11/2294 717/168 |
| 2010/0191936 A1 * | 7/2010 | Khatri | G06F 1/3203 712/42 |
| 2010/0192029 A1 | 7/2010 | Wang et al. | |
| 2012/0151475 A1 * | 6/2012 | Bealkowski | G06F 9/455 718/1 |
| 2013/0289926 A1 * | 10/2013 | Maity | G06F 9/5077 702/130 |
| 2014/0280837 A1 * | 9/2014 | Ayanam | H04L 41/24 709/223 |
| 2014/0280947 A1 * | 9/2014 | Christopher | H04L 41/08 709/226 |
| 2014/0289436 A1 * | 9/2014 | Lewis | G06F 13/24 710/260 |

OTHER PUBLICATIONS

International Search Report and Written Opinion for Application No. PCT/US2014/031550, 9 pages, dated Aug. 25, 2014.

* cited by examiner

*Primary Examiner* — Joseph Schell
(74) *Attorney, Agent, or Firm* — McCarter & English, LLP; John S. Curran

(57) ABSTRACT

A system firmware agent providing the capabilities of a Baseboard Management Controller (BMC) from within System Management Mode (SMM) is discussed. A virtual BMC provides dedicated communication channels for system firmware, other BMCs in the platform and remote management agents. The virtual BMC may monitor the status of the system, record system events, and control the system state.

30 Claims, 5 Drawing Sheets

VIRTUAL BASEBOARD MANAGEMENT CONTROLLER

RELATED APPLICATION

This application claims the benefit of U.S. Provisional Patent Application No. 61/804,556, entitled "Virtual Baseboard Management Controller Using SMM, SMBus and a Network Controller", filed on Mar. 22, 2013, the contents of which are incorporated herein by reference in their entirety.

BACKGROUND

Computing devices are initialized by firmware included within the device and this firmware provides a range of software services which facilitate the boot of the operating system (OS) as well as providing a smaller subset of these services that continue to be available after the operating system has booted. Firmware is software that has been written into Read-Only Memory (ROM) modules including, but not limited to, ROM, PROM, EPROM, EEPROM, and Flash memory (collectively referred to hereafter as "ROM"). Among other services, the firmware is responsible for operation of the computing device until a boot process can be run which loads an operating system for the computing device into memory. Once loaded, the operating system is in charge of normal operation of the computing device although the provision of certain services after loading of the operating system may require a transition of control from the operating system back to the firmware for security and other reasons.

A computing device may contain one or more elements known as Central Processing Units (CPUs). These CPUs may have a normal operating mode and a second operating mode called System Management Mode (SMM). When the CPU is in normal operating mode it can access all elements of the computer except certain memory regions exclusively dedicated to SMM. In contrast, when the CPU is operating in SMM it is able to access all elements of the computing device including the memory locations allocated for SMM. The CPU may be directed to transition from normal operating mode to SMM by a number of triggers called System Management Interrupt (SMI) events. The exact triggers available differ somewhat among system designs but the result of an SMI being triggered is that execution in main memory is immediately suspended and execution begins at a specific location in System Management memory (called SMRAM).

In addition to CPUs, computing devices include a number of other hardware components. These other hardware components may include a platform bus such as a System Management Bus (SMBus) and one or more network interface controllers (NICs). The SMBus is a two-wire bus that provides lightweight communication with low-bandwidth devices on a motherboard. The devices can provide information over the SMBus that includes identifying information, their save state for a suspend event, and different types of errors, and can also accept control parameters and return device status. Exemplary devices that can communicate over an SMBus include power-related chips, temperature sensors, fan or voltage sensors, and clock chips, etc. NICs are used by computing devices for network communication. NICs may be built onto the motherboard or may be provided via an expansion card plugged into a bus on the computing device. NICs implement the electronic circuitry required to communicate using a specific physical layer and data link layer standard and enable network communications through routable protocols, such as the Internet Protocol (IP). Incoming packets received via a NIC after an operating system has loaded may be provided to an operating system driver for handling. Among other attributes, the presence of a NIC in a computing device may also enable communication between the computing device and a remotely located user or process looking to remotely manage the computing device.

Another hardware component that may be present in a computing device is a Baseboard Management Controller. A Baseboard Management Controller (BMC) is a general name for a wide variety of microcontrollers specifically designed for platform management. BMC controllers often implement the Intelligent Platform Management Interface (IPMI), Desktop and Mobile Architecture for System Hardware (DASH) and/or Alert Standard Format (ASF) platform management specifications, along with proprietary standards. BMCs often maintain power even when the rest of the system is unpowered. The BMC can act as an intermediary between the remote manager (using a network interface), the system firmware, the platform sensors and, in some cases, the operating system. In some cases, the BMC itself has a NIC integrated. In other cases, it uses a link with a special NIC (such as the Intel® 82571) via SMBus or a proprietary interface. The BMC is not dependent on the system firmware or the operating system. The BMC requires either a dedicated network interface controller (NIC) or some means to share a NIC for the purposes of remote management.

BRIEF SUMMARY

Embodiments of the present invention enable a system firmware agent to provide the capabilities of a physical BMC from within SMM. The system firmware agent acts as a virtual BMC (vBMC) and provides dedicated communication channels for system firmware, other BMCs in the platform and remote management agents. The virtual BMC may monitor the status of the system, record system events, and control the system state to allow a computing device to be remotely managed.

In one embodiment, a computing device-implemented method for improved platform management includes generating an SMI. The SMI invokes a transition to SMM by a CPU in the computing device. The method also receives a management command with a firmware-based virtual Baseboard Management Controller executing during SMM and performs a management function for the computing device with the vBMC based on the management command. The management data resulting from the performance of the management function is then communicated while the vBMC is executing during SMM.

In another embodiment, a computing device is configured to provide enhanced management information. The computing device includes a CPU supporting SMM and a NIC for receiving and transmitting network packets over a network. The computing device also includes a platform bus and system firmware that includes a virtual Baseboard Management controller that executes when the CPU is operating in SMM. The vBMC receives a management command and performs a management function for the computing device based on the management command. The vBMC also communicates management data resulting from the performance of the management function.

BRIEF DESCRIPTION OF THE DRAWINGS

The accompanying drawings, which are incorporated in and constitute a part of this specification, illustrate one or more embodiments of the invention and, together with the description, help to explain the invention. In the drawings.

DETAILED DESCRIPTION

Figure 1:
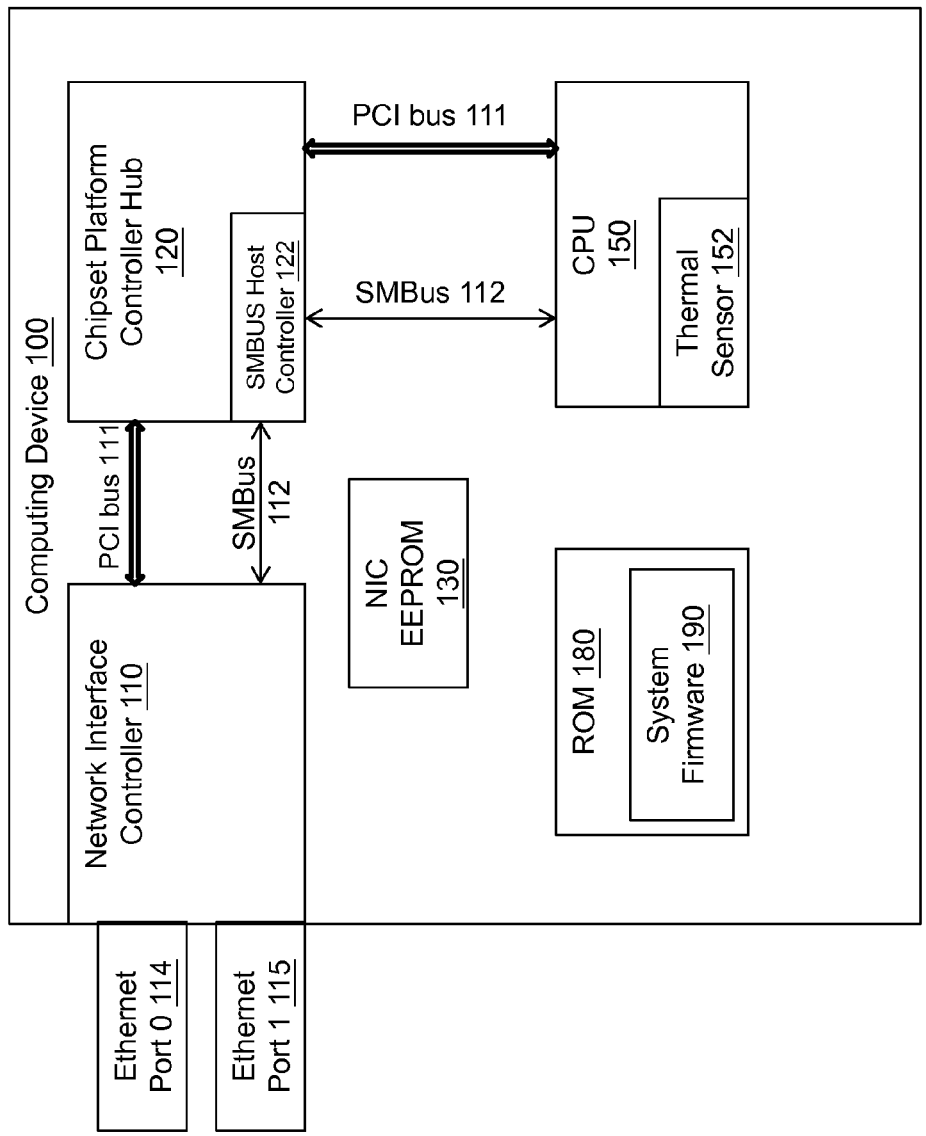
FIG. 1 depicts an exemplary computing device suitable for practicing an embodiment of the present invention.

Network-based remote platform management is expensive from both a cost and resource perspective. Previous approaches to network-based remote platform management have included the use of a remote boot application or built-in management application, the use of a baseboard management controller or a management engine and/or attempted operating system and firmware hybrid approaches. As discussed further below, each of these previously attempted approaches suffers from one or more drawbacks, either by requiring additional hardware, lacking desired capabilities or requiring a dedication of system resources that negatively impacts platform performance.

In the case of a remote boot application or built-in management application, an application is launched from system firmware, a hard disk or a remote server (for example by Pre-boot Execution Environment (PXE)), and this application can perform the necessary communication with a remote management agent to report some system status (boot, sensors), perform some diagnostics and give access to the hard disk contents for remote provisioning. An example of this is Paragon's iSCSI Target Software. This approach provides pre-boot access to the platform and can be executed on every boot. However, the approach does not provide a continuous connection between the platform and a management application after the loading of the operating system and, in some cases, may not provide access to sensor information because the sensors are not discoverable or identifiable on the platform by the application.

Alternatively, some systems have relied upon the operating system's and system firmware's BIOS capabilities to provide increased management functionality. Before boot, the firmware can remotely communicate with the administrator to provide log information and receive any update information through features such as PXE, Internet Protocol Security (IPsec) and Unified Extensible Firmware Interface (UEFI) networking. After boot, the operating system can provide this functionality through operating system drivers and services. This hybrid approach is a problem however because it requires a handoff between the firmware and the operating system and many operating systems may not support such a handoff. As a result, the board vendor cannot be sure if they have fully enabled platform management.

Because of these issues, many systems have relied upon a BMC to perform platform management. However, while a BMC provides remote management functionality, the BMC is often a costly addition to a platform, both in component cost and software development cost (since it is often a different micro-controller with a different development tool chain). The BMC also does not have access to all system information, since it cannot usually access the hardware registers, memory contents or CPU registers which would enable the BMC to track the true health state of the system. Further getting information to and from the Baseboard Management Controller can be slow, because the SMBus or similar on-platform bus is used for communication.

One other approach to remote system management employs a Management Engine (ME). An ME is a system controller located in many Intel chipsets that implements BMC-like functionality. Because it is built into the chipset, it also has additional access to system registers. However, the ME is only available if it is part of the particular chipset provided for the computing device.

In contrast to these earlier approaches to platform management, embodiments of the present invention provide a comparable level of platform management capabilities to a stand-alone BMC by using only the standard hardware found in most PCs and other computing device today. The present invention reduces cost, complexity and validation costs. Embodiments execute regardless of which operating system is running and whether that operating system is in a deadlock condition. This allows continued monitoring of the system state, recording of platform error conditions and responding to remote management requests. While an embodiment may benefit from a dedicated network connection (such as a shared NIC or dedicated and/or hidden NIC), it is not required in order to achieve the logging and monitoring advantages of the present invention. The virtual BMC of the present invention has access to more status information than a physical BMC and speeds the transfer of information by allowing the use of an in-memory mailbox scheme to conduct transactions in the same format as used when transmitting information over the SMBus or other platform bus. Further, whereas a physical BMC only has access to resources provided by the SMBus, other Intelligent Platform Management Bus/Bridge (IPMB), or the NIC, the virtual BMC of the present invention has direct access to hardware resources and the other information sources available to the platform firmware, including those present on other buses.

FIG. 1 depicts an exemplary computing device suitable for practicing an embodiment of the present invention. A computing device 100 may include NIC 110, Chipset Platform Controller Hub 120 and CPU 150. Computing device 100 may also include PCI bus 111 and SMBus 112 connecting NIC 110 and Chipset Platform Controller Hub 120. Further, computing device 110 may also include NIC EEPROM 130 holding a default configuration for NIC 110 and ROM 180 holding system firmware 190. It should be appreciated that computing device 100 may include multiple CPUs and single CPU 150 is depicted alone for ease of illustration.

An exemplary NIC 110 is the Intel® 82571 network controller. NIC 110 may include multiple network interfaces and multiple different SMBus master/slave or slave end points. NIC 110 may include multiple Ethernet ports such as Ethernet port 0 (114) and Ethernet port 1 (115). In one embodiment, NIC 110 is assigned resources by the firmware during system initialization and then hidden by a platform-specific means so that its configuration space is not visible to the operating system. This "hiding" prevents the operating system from loading a driver and attempting to configure or control the device, leaving it available for use by the system firmware. Further, in this embodiment, interrupts, which would normally be routed to an interrupt controller on the platform, may instead be routed to a general purpose input on Platform Controller Hub 120 which is configured to generate an SMI signal for the CPU.

Chipset Platform Controller Hub 120 is designed to work with CPU 150 and a memory controller. An exemplary Chipset Platform Controller Hub 120 is the Intel® 216 PCH.

Chipset Platform Controller Hub 120 provides I/O support for various peripherals, including general-purpose I/O signals (GPIOs) and an SMBus host controller 122. SMBus host controller 122 can act as a master or slave. SMBus Host Controller 122 can be configured to generate a normal PCIe interrupt (per the PCI specification) or an SMI when a transaction is complete or the SMBALERT# transition is detected.

All CPUs in a system, when they detect an SMI, interrupt execution at the next instruction boundary and begin execution in SMM. Typically, this execution location in SMM is in system memory set aside for this purpose, called System Management RAM (or SMRAM). The contents of SMRAM are initialized by the system firmware during initialization. Upon transition into SMM, the CPU begins execution at a pre-defined address, initialized by the system firmware, inside of SMRAM. An exemplary CPU 150 is the Intel® 5 Series CPU capable of executing in SMM.

Although reference to various Intel components have been made above and throughout, it should be appreciated that the embodiments of the present invention are not limited to the specifically described components and that other configurations providing similar functionality are within the scope of the present invention. For example, an embodiment may employ an SMBus host controller that is not located within Chipset Platform Controller Hub 120. Likewise, the computing device may use a different type of platform bus from an SMBus such as such as a Controller Area Network (CAN) bus and I2C bus or even on-board USB. In another embodiment, a NIC with similar functionality other than an Intel NIC from the 82571 family of GbE Ethernet controllers can be used.

Figure 2:
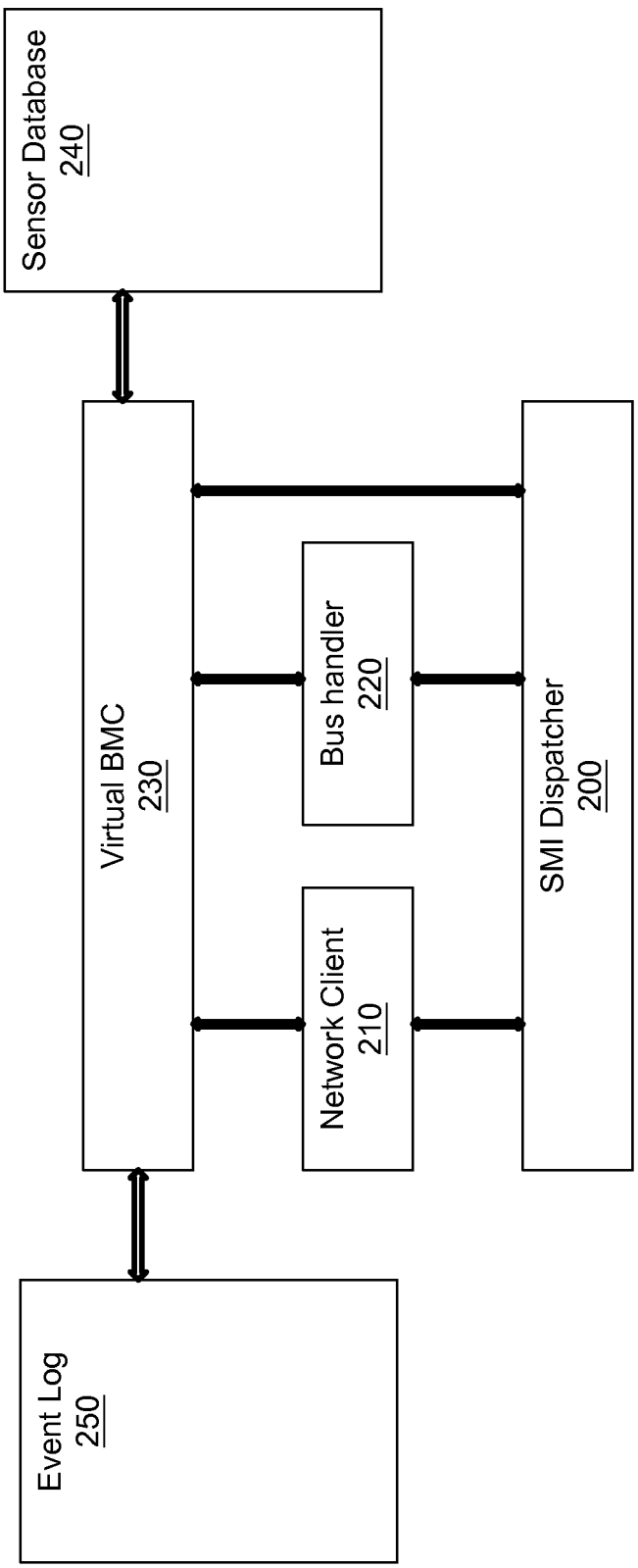
FIG. 2 depicts an exemplary software stack utilized by an embodiment of the present invention.

FIG. 2 depicts an exemplary software stack utilized by an embodiment of the present invention. The software stack provides the virtual BMC functionality within SMM. The software stack includes SMI dispatcher 200, network client 210 and a platform bus client such as SMBus handler 220.

SMI Dispatcher 200 is a standard component in most x86 system firmware implementations. SMI Dispatcher 200 receives control from the SMM entry point, detects the source of the SMI using hardware-specific mechanisms and calls any registered handlers. The handlers are registered using one of the SMM child dispatch protocols (or some other similar method, see the UEFI Platform Initialization specification). Platform Controller Hub 120 has several blocks of registers which indicate the source of the SMI. Platform Controller Hub's SMI Dispatcher driver produces several SMM child dispatch protocols, including the GPI Dispatch2, SW Dispatch2, Periodic Timer Dispatch and ICHN Dispatch. The first three are described in more detail in the UEFI Platform Initialization Specification. The last is an Intel® proprietary protocol which is used to register handlers for other SMI sources that are not described in the PI Specification. SMI Dispatcher 200 may produce the ICHN Dispatch protocol to allow registration of a callback function which will be called when an SMBus transaction is complete. This protocol is specific to Intel® chipsets. SMI Dispatcher 200 may also produce the Periodic Timer Dispatch protocol which allows a callback function to be registered that will be called back after at least a pre-defined amount of time. SMI Dispatcher 200 additionally may produce the SW Dispatch protocol which is used to register a callback function that is called when a specific value is written to the Software SMI Command Port. The Software SMI Command Port is an 8-bit I/O port which, when written to by non-SMM code, generates an SMI. Further SMI Dispatcher 200 may produce the GPI Dispatch protocol which is used to register a callback function that is associated with the transition of a specific general-purpose input.

Network client 210 is responsible for managing the network packets transmitted across the SMBus (or other platform bus). Since network packets can be as long as 1536 bytes (for the Intel NIC), but SMBus packets on the SMBus on many platforms cannot be longer than 32 or 240 bytes, the network packets are broken up into fragments for re-transmission as SMBus packets across the SMBus. Network client 210 registers for notification with Bus handler 220 when a packet is received. Network client 210 also may manage sending the next network packet (or fragment of a network packet) and handles various transmission errors. Network client 210 additionally may handle a number of standard network packets such as discovery packets. Network client 210 may be specific to a particular network controller or family of controllers, since the means of configuring the NIC and handling the network packet fragments may be proprietary. For example, the Intel® NICs use an extension of the Intelligent Platform Management Interface (IPMI) Remote Control Management Protocol (RCMP+) SMBus packet format.

Bus handler 220, which may be an SMBus handler, registers a callback function with the ICHN Dispatch protocol and the GPI Dispatch protocol. The ICHN Dispatch protocol calls back the registered function when the SMBus transaction is completed. The transaction can either be the receipt of an entire SMBus packet at the slave address. Or it can be the complete transmission of a SMBus packet sent from the SMBus master. The GPI Dispatch protocol is used to register a callback function for a transition on the SMBALERT# signal described in the SMBus Specification. This signal is used by a SMBus slave device to indicate that it has data that is ready to be read.

Virtual BMC 230 is responsible for managing the platform, independent of the operating system that is executing. Many of the features of vBMC 230 may function similarly to features described as part of the IPMI, DASH and ASF specifications despite the lack of an actual BMC. One feature of vBMC 230 is sensor monitoring. Virtual BMC 230 acts as an abstraction layer between the remote and local administrator and the actual sensors which are located on the board. vBMC 230 maintains information about each sensor on the platform, including its type, current state, thresholds and alert requirements. Virtual BMC 230 communicates with these sensors either by SMBus, other platform bus or through some other connection to Chipset Platform Controller Hub 120. The sensor information may be accessed using the commands described in the IPMI, DASH or ASF specifications.

Another feature of virtual BMC 230 is a watchdog timer. vBMC 230 provides a watchdog timer which resets the system in the case of a system hang. The watchdog timer may be implemented either using the SMM Periodic Timer (from the UEFI PI Specification) or through the TCO Watchdog timer provided by various platform chipsets. If using the SMM Periodic Timer, the timer requires an OS-present or DXE-present driver to send a heartbeat command via the OS/DXE Driver Interface. Typically these timers require a bit to be reset every so many seconds or else the system will reset and/or an alert will be sent to the remote administrator. vBMC 230 can configure the watchdog timer using a system firmware-provided value or else through external IPMI or ASF commands. A further feature of virtual BMC 230 is an event log 250. vBMC 230 may implement a system event log (SEL) 250. This can be implemented via the IPMI SEL definition or a proprietary definition.

Virtual BMC 230 may also report current system information, such as the types of components present on the platform. These can be found through SMBIOS tables or Field Replaceable Units (FRUs), which are a form of platform data repository described in the IPMI specification. The ASF, DASH and IPMI specifications provide commands for accessing this data. Additionally, Virtual BMC 230 can report the current state of the machine, except when powered off vBMC 230 can report that the machine power is on, that it is pre-boot, that it has started boot (loaded a boot sector or boot loader) and that boot has completed (ExitBootServices called or ACPI enabled or USB hand-off completed). Virtual BMC can also report system hangs. Further, vBMC 230 can force the system to power-off or reset.

Another feature of virtual BMC 230 is setup options. vBMC 230 can handle remote requests to change the boot order, via ASF, IPMI or DASH commands. These commands force the next boot to select a specific device or class of devices. vBMC 230 can handle requests to change specific setup options that are published using the DASH specification. In an embodiment, the virtual BMC can also provide debugging functionality. The vBMC can handle remote requests to dump current CPU register contents, memory contents and hardware register contents.

Figure 3:
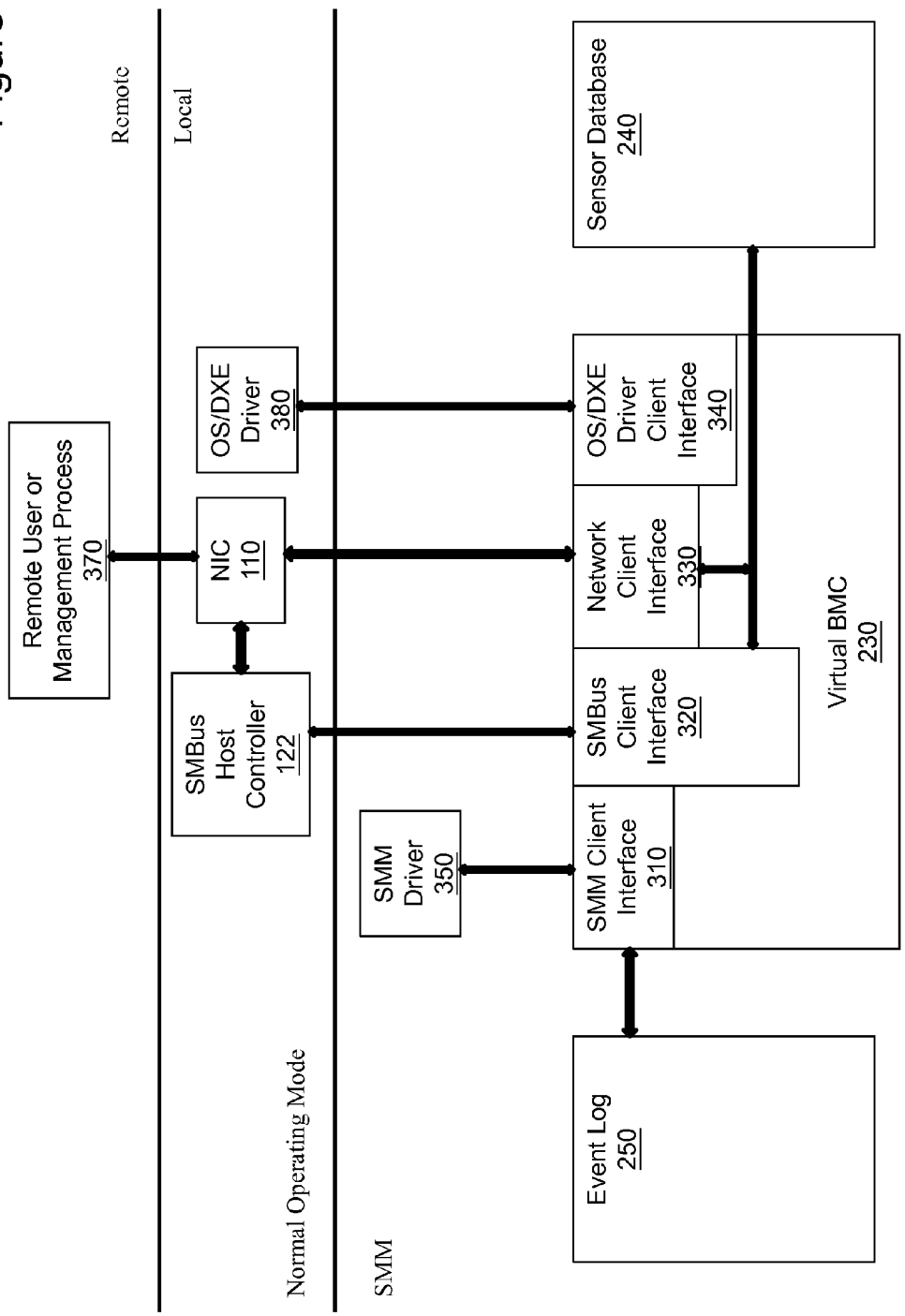
FIG. 3 depicts virtual BMC interfaces utilized by an embodiment of the present invention.

FIG. 3 depicts virtual BMC interfaces utilized by an embodiment of the present invention. Virtual BMC 230 responds to platform events by logging, recording in the sensor database or sending out alerts. vBMC 230 responds to requests by remote administrators, local administrators and even other BMCs. All of these are requests and responses may be handled via one of four interfaces: SMM client interface 310, SMBus client interface 320, network client interface 330 or OS/DXE driver client interface 340.

SMM client interface 310 may include an event log protocol which allows other SMM drivers 350 to record platform events into the vBMC event log 250. These platform events include, for example, machine check exceptions, ECC memory errors or sensor threshold issues. In one embodiment, vBMC 230 provides commands through its various interfaces (including this protocol) to read or clear the contents of error log 250.

SMBus Client interface 320 allows an external client to send requests to vBMC 230. For example, consistent with the DASH specification, a NIC can use the SMBus to send status or control messages to vBMC 230 using the Management Component Transport Protocol (DSP0237). Further, vBMC 230 may maintain a sensor database 240 which records information about all sensors on the platform. Many of these sensors may use the SMBus or other platform bus for communication. Some of the sensors may require polling while others may generate notifications when certain thresholds are reached. In one embodiment, when the sensors reach pre-defined thresholds, vBMC 230 reads their current status and, if applicable, generates a log event and/or sends an alert via SMBus client interface 320 or network client interface 330 to make a remote administrator aware of the situation.

Network client interface 330 allows a remote administrator to send requests to vBMC 230. For example, consistent with the DASH specification, a NIC can use network client interface 330 to send status or control messages to vBMC 230. Virtual BMC 230 responds to these requests. In addition, vBMC 230 may use network client interface 330 to send out notification messages or alerts to the remote administrator or management process.

OS/DXE driver interface 340, rather than being a single interface, is instead a collection of interfaces that allow a local OS driver or DXE driver 380 to communicate with vBMC 230 (DXE drivers are utilized during system initialization). One interface among the collection of interfaces may be for SMBus 112. OS/DXE Driver 380 may communicate using the SMBus host controller 122 by issuing a command. The command may be handled by the vBMC's SMBus interface 320. Another interface in the collection of interfaces may be an emulated IPMI System Interface. The vBMC 230 can emulate a standard EC-style interface, such as the Keyboard Controller Style (KCS), Server Management Interface Chip (SMIC) or Block Transfer (BT) system interfaces described in the IPMI Specification. That is, when OS/DXE driver 380 writes or reads from one of the 110 ports used by these system interfaces, an SMI is generated. On a read, the contents of the AL register in the SMM CPU Save State may be updated with the read value. On writes, the contents of the AL register in the SMM CPU Save State may be used for the command. Using this technique allows support for many existing OS drivers without modification since the IPMI and DASH specifications provide standard means for discovering these system interfaces. Another indirect interface in the OS/DXE collection of interfaces may be provided by virtual BMC 230 using a mailbox scheme utilizing a software SMI. For this technique, the OS/DXE driver 380 writes the management commands to a system memory buffer whose address is pre-arranged with vBMC 230. Then OS/DXE driver 380 writes a pre-determined value to the software SMI 110 port. vBMC 230 then reads the command from the memory buffer, performs the operation, and places any result in the system memory buffer and resumes normal operation. This type of interface is significantly faster than using the SMBus or other platform bus, since it can support larger command sizes without fragmentation required on the platform bus and there are fewer 110 cycles involved.

Figure 4:
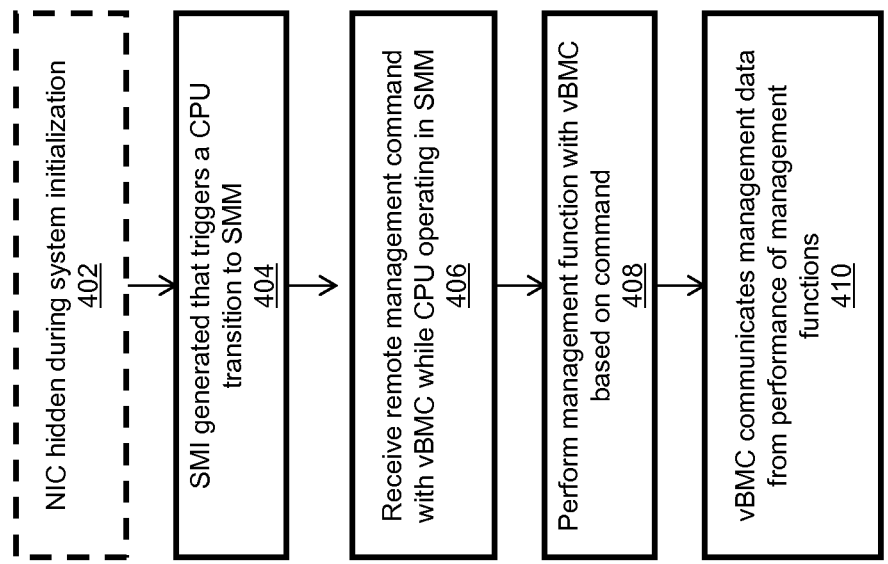
FIG. 4 depicts an exemplary sequence of steps followed by an embodiment of the present invention to process a management command with a firmware-based virtual BMC.

FIG. 4 depicts an exemplary sequence of steps followed by an embodiment of the present invention to process a management command with a firmware-based virtual BMC. The sequence optionally begins when resources are provided to a NIC during system initialization and a platform-specific techniques used to hide the NIC so that it is hidden from the operating system (step 402). As an example, many Intel chipsets provide a way to hide the internal NIC device so that it does not appear on the PCI bus, or to prevent a specific PCI slot from responding to the OS as "present". This assures that the NIC is available for exclusive use by the vBMC. It will be appreciated however that other techniques using a dedicated NIC not hidden from the operating system or a shared NIC are also within the scope of the present invention. For example, a non-PCI device which the operating system cannot detect because it does not reside on an OS-enumerable bus. In one embodiment, local or remote management requests to the interfaces of the vBMC trigger an SMI that causes a CPU in the computing device to transition to SMM (step 204). It will be appreciated that the SMI may also be generated in other ways such as writing a value to software SMI I/O port. Alternatively, the SMI may be generated following the receipt of a remote management command by a NIC for the computing device by redirecting an interrupt signal generated by the NIC to a general purpose input on the Chipset Platform Controller Hub that is configured to generate an SMI signal for the CPU. The virtual BMC receives the remote management command following the CPU's transition to SMM (step 406) and performs a management function based on the command (step 408). For example, the vBMC may retrieve sensor data or error log information or may alter a setup option such as a boot order for the computing device in response to the management command. The vBMC communicates the management data resulting from the performance of the management function to the requesting entity via one of its supported interfaces (step 410). For example, the vBMC may communicate the information via a platform bus such as an SMBus to an OS or DXE driver or may communicate over a PCI bus to a remotely located management agent.

Figure 5:
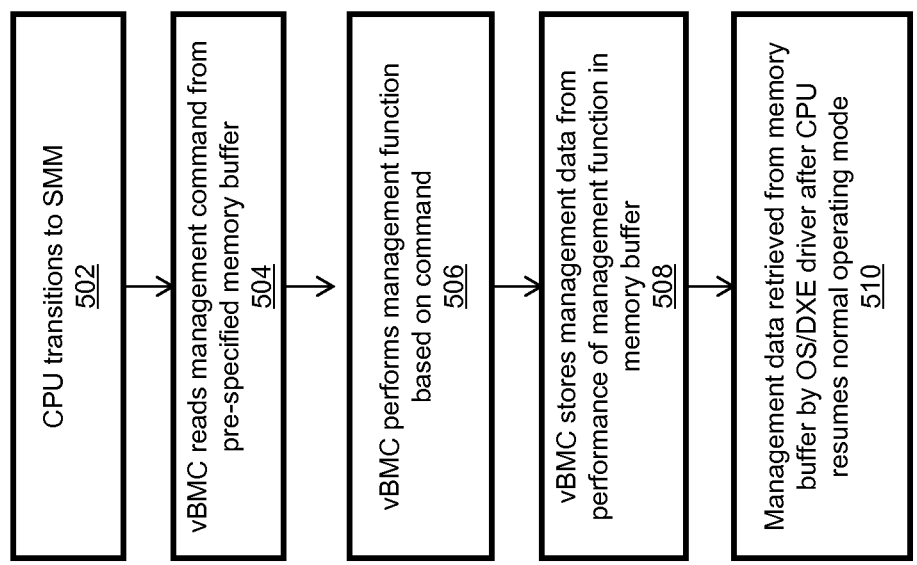
FIG. 5 depicts an exemplary sequence of steps followed by an embodiment of the present invention to increase the speed of processing a management command with a firmware-based virtual BMC by using a pre-specified memory buffer.

As noted above, another technique by which the vBMC executing during SMM may communicate management data to a requesting user or process is through the use a pre-specified memory buffer. FIG. 5 depicts an exemplary sequence of steps followed by an embodiment of the present invention to increase the speed of processing a management command with a firmware-based virtual BMC by using a pre-specified memory buffer. Following a transition to SMM by the computing device's CPU (step 502), the vBMC reads a management command from a pre-specified memory buffer (step 504). The management command was placed in the pre-specified buffer by a process or application executing earlier while the CPU was in normal operation mode that requires management information available to the system firmware but not to the application or process. For example, the management command may be initially stored in the pre-specified memory buffer by an OS or DXE driver before they triggered an SMI that caused the transition to SMM. The vBMC performs a management function based on the retrieved command (step 506) and stores resulting data from the performance of the management function in the pre-specified memory buffer from which the management command was retrieved (step 508). The management data, which may be actual data such as sensor data or an acknowledgement of completion of a task such as changing a setup configuration for the computing device in response to a command, may then be retrieved from the pre-specified memory buffer by the requesting entity such as an OS or DXE driver (step 510). It will be appreciated that the use of more than one memory buffer is also within the scope of the present invention. For example, a first specified memory buffer may be used for command storage and retrieval while a second specified memory buffer may be used for storing the results of the performance of the command.

In another embodiment, an alternate NIC other than those described herein may be used. Although an embodiment using an Intel NIC from the 82571 family of GbE Ethernet controllers has been described herein, other NICs with similar functionality can also be used within the scope of the present invention. Similarly, although an embodiment using a separate NIC for the vBMC communication has been described herein, shared NICs may also be utilized by an embodiment of the present invention. A single NIC may be shared between the OS and the vBMC firmware with the NIC filtering out the network packets destined for the vBMC and handing them to the vBMC using another method (such as the SMM mailbox mechanism described herein). Such a shared NIC also provides a means for the vBMC to transmit network packets without interfering with normal operation.

In a further embodiment utilizing a shared NIC, the virtual BMC sends and receives network packets by communicating with the OS NIC driver via a mailbox mechanism. For example, when packets are received by the OS NIC driver that are designated for the virtual BMC network client, they may be placed in a memory buffer (the mailbox) and a software SMI may then be generated. The virtual BMC network client assembles the packets from the mailbox buffer. When the virtual BMC network client wants to transmit a network packet, it places the packet contents in a mailbox memory buffer and sets a flag. The OS NIC driver periodically polls (or is notified via an interrupt) the mailbox buffer and sends out the packet, clearing the flag.

In another embodiment, a pre-OS NIC may be used that is not present for use by the virtual BMC during runtime. In such a case, the NIC is only available to the virtual BMC before the operating system starts. The virtual BMC still monitors the platform, has a watchdog timer, and can communicate with OS-present remote administration software. Pending events are cached until the next reboot, along with a check to see if the remote administrator wants to take pre-OS control of the machine. Using another control path, the remote administrator may then reboot the machine and take control of the system during the pre-OS phase.

In a further embodiment, an alternate processor may be used. In the ARM family, there is no SMM. However, a comparable feature, TrustZone is available. Accordingly, writes to software SMI I/O port as described above may be replaced with the smic instruction. In this embodiment, only a single CPU enters TrustZone at a time and there is no dedicated SMI# signal.

While embodiments using SMBus as on-platform transport have been described above, any number of other on-platform buses can be used instead. In other embodiments alternate platform buses such as Fast Management Link bus (FML), IPMB, CAN and I2C may be used by an embodiment of the present invention. FML is the Fast Management Link bus, which is a modified version of SMBus. IPMI describes the IPMB used for communication with BMCs. The main requirement is that this platform bus is supported by the NIC and that there is a platform bus host controller which can send and receive packets on this bus and that this platform bus host controller can generate an SMI# at the appropriate points during the transaction process, so that the virtual BMC SMM client can gain control.

Portions or all of the embodiments of the present invention may be provided as one or more computer-readable programs or code embodied on or in one or more non-transitory mediums. The mediums may be, but are not limited to, a hard disk, a compact disc, a digital versatile disc, ROM, PROM, EPROM, EEPROM, Flash memory, a RAM, or a magnetic tape. In general, the computer-readable programs or code may be implemented in any computing language.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

I claim:

1. A computing device-implemented method for improved platform management, comprising:
generating a System Management Interrupt (SMI), the SMI invoking a transition to System Management Mode (SMM) by a central processing unit (CPU) in the computing device;
receiving a management command with a firmware-based virtual Baseboard Management Controller (vBMC) executing during SMM;

performing a management function for the computing device with the vBMC based on the management command; and communicating management data resulting from the performance of the management function while the vBMC is executing during SMM.

2. The method of claim 1 wherein the management data is at least one of data regarding monitored sensors in the computing device, information regarding logged events affecting the computing device, system information regarding components of the computing device and status information for the computing device.

3. The method of claim 1 wherein the vBMC, in response to the management command, performs at least one of a change to a setup option for the computing device and a debug operation.

4. The method of claim 1 wherein the vBMC provides a watchdog timer enabling the reset of the computing device in the case of a system hang.

5. The method of claim 1 wherein the vBMC includes an interface for a platform bus and receives the management command over the platform bus.

6. The method of claim 5 wherein the computing device includes sensors and the vBMC communicates over the platform bus with the sensors.

7. The method of claim 1 wherein the vBMC includes a network interface enabling communication with a Network Interface Controller and receives a management command from a remote management process or user via the network interface.

8. The method of claim 1 wherein the vBMC includes an operating system (OS)/driver execution environment (DXE) interface enabling at least one of a local OS driver and DXE driver to communicate with the vBMC.

9. The method of claim 1 wherein the vBMC includes an SMM interface enabling an SMM driver to communicate with the vBMC.

10. The method of claim 1, further comprising:
reading the management command with the vBMC from a pre-specified memory buffer, wherein the management command is written to the memory buffer by an operating system (OS) driver or Driver Execution Environment (DXE) driver before the transition to SMM;
storing the management data resulting from the performance of the management function in the memory buffer with the vBMC while the CPU is executing in SMM; and
triggering a return to a normal operating mode for the CPU, wherein the stored management data is retrieved from the memory buffer following the return to normal operating mode for the CPU by the OS or DXE driver.

11. A non-transitory medium holding computer-executable instructions for improved platform management, the instructions when executed causing a computing device to:
generate a System Management Interrupt (SMI), the SMI invoking a transition to System Management Mode (SMM) by a central processing unit (CPU) in the computing device;
receive a management command with a firmware-based virtual Baseboard Management Controller (vBMC) executing during SMM;
perform a management function for the computing device with the vBMC based on the management command; and
communicate management data resulting from the performance of the management function while the vBMC is executing during SMM.

12. The medium of claim 11 wherein the management data is at least one of data regarding monitored sensors in the computing device, information regarding logged events affecting the computing device, system information regarding components of the computing device and status information for the computing device.

13. The medium of claim 11 wherein the vBMC, in response to the management command, performs at least one of a change to a setup option for the computing device and a debug operation.

14. The medium of claim 11 wherein the vBMC provides a watchdog timer enabling the reset of the computing device in the case of a system hang.

15. The medium of claim 11 wherein the vBMC includes an interface for a platform bus and receives the management command over the platform bus.

16. The medium of claim 15 wherein the computing device includes sensors and the vBMC communicates over the platform bus with the sensors.

17. The medium of claim 11 wherein the vBMC includes a network interface for enabling communication with a Network Interface Controller and receives a management command from a remote management process or user via the network interface.

18. The medium of claim 11 wherein the vBMC includes an operating system (OS)/driver execution environment (DXE) interface enabling at least one of a local OS driver and DXE driver to communicate with the vBMC.

19. The medium of claim 11 wherein the vBMC includes an SMM interface enabling an SMM driver to communicate with the vBMC.

20. The medium of claim 11 wherein the instructions when executed further cause the computing device to:
read the management command with the vBMC from a pre-specified memory buffer, the management command written to the memory buffer by an operating system (OS) driver or Driver Execution Environment (DXE) driver before the transition to SMM;
store the management data resulting from the performance of the management function in the memory buffer with the vBMC while the CPU is executing in SMM; and
trigger a return to a normal operating mode for the CPU, the stored management data retrieved from the memory buffer following the return to normal operating mode for the CPU.

21. A computing device configured to provide enhanced management information, comprising:
a central processing unit (CPU) supporting System Management Mode (SMM);
a Network Interface controller (NIC) for receiving and transmitting network packets over a network;
a platform management bus; and
system firmware that includes a virtual Baseboard Management controller (vBMC) that executes when the CPU is operating in SMM, the vBMC:
receiving a management command;
performing a management function for the computing device based on the management command; and
communicating management data resulting from the performance of the management function.

22. The computing device of claim 21, further comprising:
a pre-specified memory buffer, wherein the management command is read from the memory buffer with the vBMC, the management command written to the memory buffer by an operating system (OS) driver or Driver Execution Environment (DXE) driver before a transition to SMM, wherein the management data results from the performance of the management function stored in the memory buffer with the vBMC while the CPU is executing in SMM, and the management data retrieved from the memory buffer by the OS or DXE driver following a return to normal operating mode for the CPU.

23. The computing device of claim 21 wherein the management data is at least one of data regarding monitored sensors in the computing device, information regarding logged events affecting the computing device, system information regarding components of the computing device and status information for the computing device.

24. The computing device of claim 21 wherein the vBMC, in response to the management command, performs at least one of a change to a setup option for the computing device and a debug operation.

25. The computing device of claim 21 wherein the vBMC provides a watchdog timer enabling the reset of the computing device in the case of a system hang.

26. The computing device of claim 21 wherein the vBMC includes an interface for a platform bus and receives the management command over the platform bus.

27. The computing device of claim 26 wherein the computing device includes sensors and the vBMC communicates over the platform bus with the sensors.

28. The computing device of claim 21 wherein the vBMC includes a network interface for enabling communication with a Network Interface Controller and receives a management command from a remote management process or user via the network interface.

29. The computing device of claim 21 wherein the vBMC includes an operating system (OS)/driver execution environment (DXE) interface enabling at least one of a local OS driver and DXE driver to communicate with the vBMC.

30. The computing device of claim 21 wherein the vBMC includes an SMM interface enabling an SMM driver to communicate with the vBMC.

* * * * *